Oct. 10, 1967     F. SCHWARZER     3,346,312

RECORDING APPARATUS STRUCTURE

Filed May 2, 1966     2 Sheets-Sheet 1

FRITZ SCHWARZER,
*INVENTOR*

Oct. 10, 1967   F. SCHWARZER   3,346,312
RECORDING APPARATUS STRUCTURE
Filed May 2, 1966   2 Sheets-Sheet 2

INVENTOR:
BY FRITZ SCHWARZER
Stephen H. Frishauf
Atty

United States Patent Office 3,346,312
Patented Oct. 10, 1967

3,346,312
RECORDING APPARATUS STRUCTURE
Fritz Schwarzer, Barmannstr. 38,
Munich-Pasing, Germany
Filed May 2, 1966, Ser. No. 546,659
Claims priority, application Germany, May 8, 1965,
Sch 38,174
5 Claims. (Cl. 312—234)

ABSTRACT OF THE DISCLOSURE

A recording assembly is swingably mounted in the cabinet and has guide means, such as a form deflection arm associated therewith to guide a continuous record paper over an inspection panel, and then downwardly along the apparatus for ready storage, with the panel inclined for ease of inspection.

---

Figure 1:
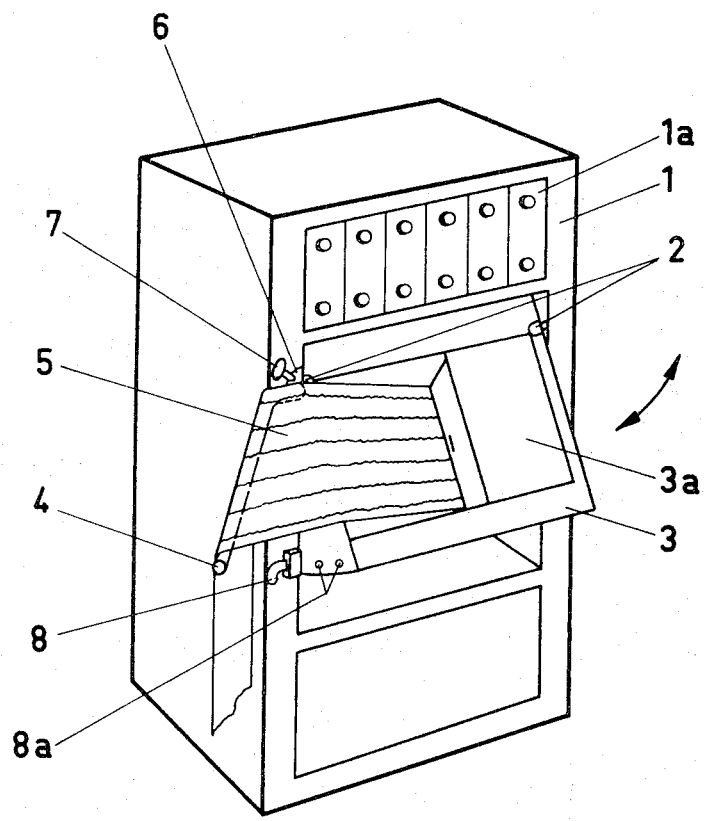

The present invention relates to a recording apparatus structure and more particularly to a cabinet to house a recording assembly arranged to have a recording assembly at a convenient location, and angle for visual inspection.

Mechanical oscillographs containing direct writing and recording apparatus are usually arranged in such a way that recording forms, usually of paper, are exposed for visual control and inspection by the user. Such apparatus is usually arranged that the path of the recording paper is substantially horizontal, so that the traces made by the oscillograph can be readily observed.

It is of advantage to provide apparatus of this kind in combination with other devices, and arrange this apparatus in a large cabinet having a vertical front wall. This cabinet, with its front wall, may further be arranged to have drawers containing various electronic components arranged therein, with the control elements for the components on the front wall. This may increase the height of the cabinet to such an extent that it is no longer possible to inspect the trace of an oscillograph on a record form from above. Mounting the oscillograph recorder vertically has the disadvantage that it is inconvenient and difficult to mount the oscillograph record at the proper height for all users.

Arrangements have been proposed in which a form of table projects from the cabinet, and the recording form or record paper passes in a horizontal path over the horizontal recorder. Such projecting elements, or table parts, require a substantial amount of space which may be at a premium where the cabinet is placed; they further introduce difficulties with proper feed and pickup of the record paper, when the apparatus is arranged so that the table projection can be pushed within the cabinet in the form of a drawer. Such apparatus further introduces difficulty in its construction because, the entire cabinet may become unbalanced and unstable when it is drawn out to the user position, particularly when a number of parallel tracks are to be recorded so that the paper width itself, and thus the projection of the table is in the order of two feet or so.

It is an object of the present invention to provide a recording apparatus structure in which recording apparatus is mounted such that it can easily be flush with the front wall of the apparatus, or projecting for convenient visual inspection; and which further permits ready pay-out of recorded paper without interference with the movement of the recording apparatus in the cabinet.

Briefly, in accordance with the present invention, the recording apparatus comprises an upright cabinet which has a vertical front wall on which control means, or spaces for drawers of various kinds of apparatus can be arranged. A recording assembly is provided, which has a panel, preferably rectangular, over which the recording paper is adapted to run. The recording assembly is movably mounted in the cabinet in such a manner that the inspection panel of the assembly is inclined at an acute angle with respect to the plane of the front wall of the apparatus cabinet. The lower edge of the panel projects from the front wall, and the upper edge is substantially flush with it. This permits ease of inspection of the recording, both from a sitting as well as a standing position of the user.

The recording assembly can be mounted in the cabinet either to be swingable about an axis substantially coincident with the upper edge of the inspection panel; alternatively, it can be mounted to swing up, on tracks formed in the cabinet, or swing in and out with ordinary drawer slides; in the latter case, a cover panel is preferably provided to prevent mechanical damage or dust contamination.

In order to provide continuous, smooth pay-out of recording paper, a deflection arm is provided, secured at the upper edge and at a corner of the recording assembly. This arm is arranged to be swingable into any convenient position so that the recording paper travels thereover smoothly and without leaving bulges, for collection on the floor; alternatively, a drawer which preferably swings out of the cabinet about a vertical hinge at the front wall thereof, can be provided at the lower part of the cabinet to collect recorded form paper.

The angle formed by the inspection panel with respect to the front wall is acute, and preferably somewhat less than 45°. The exact position of the inspection panel, and thus the angle of projection, is preferably adjustable, from the example by means of a set screw or by snap springs engaging holes or notches, to provide for convenience to the user and proper pay-out of the paper during recording.

Figure 2:
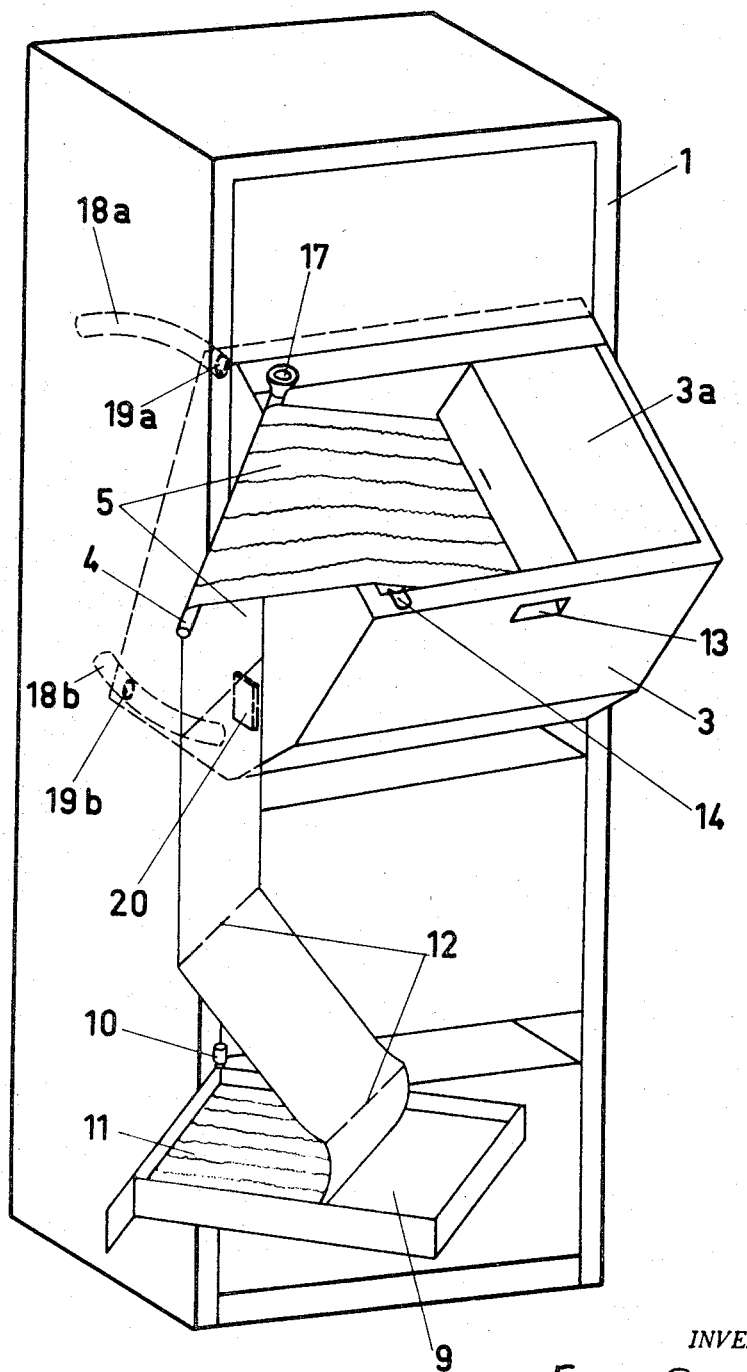

The structure, organization and operation of the invention will now be described more specifically in the following detailed description with reference to the accompanying drawings, in which FIG. 1 illustrates a cabinet, a recording assembly swingably mounted therein; and FIG. 2 illustrates a slidably mounted recording assembly, and a collection drawer.

Referring now to the drawings, and in particular to FIG. 1: the cabinet 1, which may include various apparatus such as electronic assemblies having control knobs, drawer units and the like schematically shown at 1a, is provided with a pair of inwardly extending bolts 2 about which a recording assembly 3 is arranged to swing outwardly so that the top face 3a, which may also include a panel to observe, and inspect the recording, forms an acute angle with the front wall of the cabinet 1. The angle itself, of panel 3a, is adjustable; a suitable angle is about 45° or less. Adjustment can be by means of snap springs, or a snap bolt, fitting into holes 8a, or by means of a screw bolt 8 operating in the manner of a set screw.

Pay-out of the paper 5, from the recorder, can readily be arranged by means of a deflection member or deflection arm 4, mounted in a universally adjustable socket 6 by means of a set screw 7. The angle of inclination of arm 4, both with respect to the vertical as well as with respect to the edge of recording assembly 3, can be arranged so that the paper slides smoothly over deflection arm 4 without forming bulges or kinks. Deflection arm 4 may consist of a polished metal member, or of rollers mounted on a pin, or the like. Adjustment of the arm 4 so that the paper folds smoothly thereover also prevents distortion of the paper which may cause distortion of the recordings thereon.

FIG. 2 illustrates a form of the invention in which the recording assembly does not swing about the hinge, but rather is mounted with rollers or pins to travel in a track, similar to an arrangement of desk drawers. The recording assembly 3, again having a panel or reading surface 3a, is provided on the sides with pins, or rollers 19a, 19b engaging in tracks 18a, 18b formed in the side of cabinet 1. A similar arrangement is provided on the other side of the recording assembly, and the cabinet, not shown in the drawing for ease of illustration. The deflection arm 4, having the paper 5 travels thereover, is mounted for universal adjustment by means of a socket, and set knob 17 on the recording assembly itself. For storage, it can be swung inwardly and placed in a recess 14 of the recording assembly. The paper 5, after rolling over the arm 4, folds in a stack 11, about creases 12 pre-formed therein. For convenience, a drawer 9, arranged to swing over a vertical pin 10 formed on the front wall of the cabinet, is provided. Drawer 9, by swinging out, can accept paper directly from the recording assembly 3, thus providing in one cabinet convenient storage of the record made by the recording assembly, without requiring additional handling, or separate arrangements. Recording assembly 3 can readily be handled by means of a front handle 13, preferably of the recessed type.

The angle formed by the assembly 3 with the front wall of cabinet 1 can again be adjusted by means, not shown, similar to the snap bolt or turn bolt 8, as shown in FIG. 1. It can be arranged to suit the convenience of the user, both from a sitting as well as from a standing position. The paper, by being inclined, can easily be handled without distortion and stored in the self-contained unit.

To close the cabinet of FIG. 2, the paper is severed, deflection arm 17 placed within the recording assembly 3, and the unit pushed upwardly, thus providing a substantially smooth front outline of the cabinet requiring a minimum amount of floor space. Further, since the extent of projection of the recording assembly is limited, and part of the equipment is still within the outline of cabinet 1, there is little likelihood of the entire cabinet becoming top-heavy or unstable.

The extent of projection of the visible portion of the recording apparatus is limited not only by screw 8 but also by a cooperating catch plate or stop 20 (FIG. 2) engaging the inside of the front wall of the cabinet, screw 8, or any other convenient obstruction. Stop 20 may be spring loaded to permit its disengagement similar to catches in file drawers.

Stop 20 is so arranged on the recording apparatus that the maximum projection of the recording apparatus will still maintain the center of gravity of the entire structure well within the outline of the cabinet at, for example, more than 20%, and preferably one-third or more, and approaching the ideal center, of the depth of the apparatus back from the front wall. Both the hinge construction (FIG. 1) and the drawing slide construction (FIG. 2) of the recording apparatus structure is therefore stable and not subject to damage, or a hazard to the user. Furthermore the hinge construction in FIG. 1 may also be designed in such a manner that the upper edge is tilted inwardly about lower hinge points, arranged downwardly relative to the hinge points in FIG. 1.

I claim:

1. Recording apparatus structure comprising an upright cabinet having a vertical front wall; and a recording assembly, said recording assembly having a panel arranged for visual inspection of a continuous record form passing sideways with respect to said cabinet over said panel and having an upper and a lower edge, said recording assembly being swingably mounted about an axis substantially coincident with the upper edge of said panel to permit extension of said assembly to a projecting position for convenient visual inspection of the record and retraction into a flat space-saving position; said panel, when extended, being inclined at an acute angle with respect to the plane of said front wall, the lower edge of said panel projecting from said front wall the upper edge thereof in substantial alignment with said front wall; and guide means guiding said continuous record forms sideways with respect to said cabinet over said panel for subsequent storage.

2. Structure as claimed in claim 1 including stop means limiting the extent of swinging movement of said recording assembly.

3. Structure as claimed in claim 1 wherein said apparatus further includes a form deflection member secured to said apparatus adjacent the upper edge of said panel and at the corner thereof, said form deflection member being adjustable in a plurality of planes to guide record forms from said panel thereover and for subsequent storage.

4. Structure as claimed in claim 3 wherein said apparatus further includes a storage drawer movably mounted in said cabinet to project therefrom and to retract therein and located below said recording assembly and in a position to receive and store record forms from said recording assembly passing over said deflection member and feeding by gravity into said storage drawer.

5. Structure as claimed in claim 4 wherein said storage drawer is swingable about an axis substantially in the plane of the front wall of the cabinet.

References Cited

UNITED STATES PATENTS

| | | | |
|---|---|---|---|
| 1,719,966 | 7/1929 | Burns | 312—280 X |
| 2,420,011 | 5/1947 | Paxton et al. | 312—328 X |
| 2,805,113 | 9/1957 | Brown et al. | 346—136 X |
| 2,809,085 | 10/1957 | Fall | 312—323 |
| 2,906,581 | 9/1959 | Huden | 346—136 X |
| 3,162,498 | 12/1964 | Galati et al. | 312—323 |
| 3,196,448 | 7/1965 | Hunt | 346—136 X |

CASMIR A. NUNBERG, *Primary Examiner.*